United States Patent
Chen

(10) Patent No.: US 10,632,335 B2
(45) Date of Patent: Apr. 28, 2020

(54) MAGNETICALLY-CONTROLLED DAMPING DEVICE

(71) Applicant: Yi-Tzu Chen, Taoyuan (TW)

(72) Inventor: Yi-Tzu Chen, Taoyuan (TW)

(*) Notice: Subject to any disclaimer, the term of this patent is extended or adjusted under 35 U.S.C. 154(b) by 17 days.

(21) Appl. No.: 16/037,014

(22) Filed: Jul. 17, 2018

(65) Prior Publication Data
US 2020/0023221 A1 Jan. 23, 2020

(51) Int. Cl.
| | | |
|---|---|---|
| *H02K 49/10* | (2006.01) | |
| *A63B 21/005* | (2006.01) | |
| *F16C 1/10* | (2006.01) | |
| *A63B 21/02* | (2006.01) | |
| *H02K 49/04* | (2006.01) | |
| *A63B 21/00* | (2006.01) | |
| *A63B 22/06* | (2006.01) | |
| *A63B 21/04* | (2006.01) | |

(52) U.S. Cl.
CPC ........ *A63B 21/0056* (2013.01); *A63B 21/023* (2013.01); *A63B 21/0435* (2013.01); *A63B 21/152* (2013.01); *A63B 22/0605* (2013.01); *F16C 1/10* (2013.01); *H02K 49/043* (2013.01)

(58) Field of Classification Search
CPC ............ A63B 21/0051; A63B 22/0605; F16D 63/002; H02K 49/043; H02K 49/106
See application file for complete search history.

(56) References Cited

U.S. PATENT DOCUMENTS

| | | | | |
|---|---|---|---|---|
| 5,711,404 A | * | 1/1998 | Lee | A63B 21/0051 188/158 |
| 6,273,845 B1 | * | 8/2001 | Liou | A63B 21/0051 188/164 |
| 6,345,703 B1 | * | 2/2002 | Peng | F16F 15/035 188/164 |
| 6,360,855 B1 | * | 3/2002 | Szu-Yin | A63B 21/0051 188/161 |
| 7,018,324 B1 | * | 3/2006 | Lin | A63B 21/0052 188/158 |
| 7,451,859 B2 | * | 11/2008 | Yin | A63B 21/0051 188/161 |
| 8,957,641 B1 | * | 2/2015 | Hsu | A63B 21/0051 322/4 |
| 2001/0003110 A1 | * | 6/2001 | Lay | A63B 21/0051 482/57 |
| 2002/0166737 A1 | * | 11/2002 | Chen | A63B 21/0052 188/74 |
| 2003/0070889 A1 | * | 4/2003 | Lin | A63B 21/0051 188/74 |

(Continued)

*Primary Examiner* — Bradley T King
(74) *Attorney, Agent, or Firm* — Bacon & Thomas, PLLC

(57) ABSTRACT

A magnetically-controlled damping device has a fixing disk, a rotating disk, a plurality of friction-proof sleeves, a plurality of brake shoes, a plurality of magnets, an elastic element, and an operating element. The rotating disk has a plurality of guiding rods sleeved by the friction-proof sleeves respectively. By adjusting a distance between the magnets and a rotating wheel, a damping value of the magnetically-controlled damping device can be adjusted. Moreover, since the friction-proof sleeves are between the guiding rods and the guiding grooves, the guiding rods do not wear out. The magnetically-controlled damping device can provide a more stable damping value and a longer service life.

8 Claims, 6 Drawing Sheets

(56) References Cited

U.S. PATENT DOCUMENTS

| | | | | |
|---|---|---|---|---|
| 2003/0087731 A1* | 5/2003 | Huang | ............... | A63B 21/0051 |
| | | | | 482/57 |
| 2007/0021278 A1 | 1/2007 | Pan | ................... | A63B 21/0051 |
| | | | | 482/63 |
| 2008/0261775 A1* | 10/2008 | Chang | ............... | A63B 21/0051 |
| | | | | 482/5 |
| 2010/0069205 A1* | 3/2010 | Lee | ................... | A63B 21/0051 |
| | | | | 482/63 |
| 2010/0213017 A1* | 8/2010 | Cheng | ................. | H02K 49/043 |
| | | | | 188/164 |
| 2012/0227537 A1* | 9/2012 | Chen | ....................... | F16F 15/31 |
| | | | | 74/574.1 |
| 2015/0069872 A1* | 3/2015 | Zhu | .................... | H02K 49/043 |
| | | | | 310/105 |
| 2015/0204399 A1* | 7/2015 | Schmidt | .............. | B60K 7/0007 |
| | | | | 188/161 |
| 2016/0263415 A1* | 9/2016 | Chen | ................. | A63B 21/0051 |
| 2018/0102695 A1* | 4/2018 | Lee | ........................ | H02K 24/00 |

* cited by examiner

MAGNETICALLY-CONTROLLED DAMPING DEVICE

BACKGROUND OF THE INVENTION

1. Field of the Invention

The present invention relates to a speed reduction device provided on a rotating wheel, especially to a magnetically-controlled damping device that decelerates the rotating wheel with magnetic resistance.

2. Description of the Prior Arts

A spinning bike is a common fitness equipment. By adjusting resistance applied on a rotating wheel of the spinning bike, a user can train his or her cardiorespiratory endurance to improve exercise efficiency during a long-term pedaling process. Conventional resistance devices on the spinning bike may be frictional or hydraulic. The frictional resistance device is prone to wear and instability under long-term use. The hydraulic resistance device has the disadvantages of causing oil leakage, noise, and high temperature. Therefore, a non-contact magnetically-controlled damping device is invented.

In a conventional magnetically-controlled damping device, magnetic flux applied to the rotating wheel is changed by changing a distance between magnets of the conventional magnetically-controlled damping device and the rotating wheel, and the resistance applied on the rotating wheel is adjusted according to magnetic force applied on the rotating wheel. A mechanism for guiding the movement of the magnets has a guide rod, which will be worn under long-term use, resulting in a change in a preset travel distance between the magnets and the rotating wheel. Thus, a damping value provided by the conventional magnetically-controlled damping device is unstable.

Therefore, the conventional magnetically-controlled damping device needs to be improved.

SUMMARY OF THE INVENTION

The main objective of the present invention is to provide a magnetically-controlled damping device that can decrease abrasion on guiding rods and resistance caused by the guiding rods during movements of the guiding rods.

The magnetically-controlled damping device comprises a fixing disk, a rotating disk, a plurality of friction-proof sleeves, a plurality of brake shoes, a plurality of magnets, an elastic element, and an operating element.

The fixing disk comprises an assembling surface, and a fixing portion disposed on the assembling surface of the fixing disk.

The rotating disk is rotatably mounted on the assembling surface of the fixing disk, is located between the fixing disk and the brake shoes, and includes a first side surface facing the fixing disk, a second side surface being opposite to the first side surface, and a plurality of guiding rods protruding from the second side surface of the rotating disk.

The friction-proof sleeves are mounted on the guiding rods respectively.

The brake shoes are movable relative to the rotating disk and the fixing disk and each of the brake shoes includes a plurality of guiding grooves. The guiding grooves are located around the friction-proof sleeves respectively. Each guiding groove has a respective inner sidewall defined around the guiding groove and abutting against an outer sidewall of a corresponding one of the friction-proof sleeves.

The magnets are mounted on outer side surfaces of the brake shoes. The elastic element is mounted between and is connected to the fixing portion and the rotating disk, and allows the rotating disk to rotate relative to the fixing disk. The operating element is able to drive the rotating disk to rotate relative to the fixing disk against an elastic force of the elastic element. When the operating element drives the rotating disk to rotate, the rotating disk moves the brake shoes through the guiding rods, the friction-proof sleeves, and the guiding grooves.

The magnetically-controlled damping device of the present invention has the following advantages. Since the friction-proof sleeves are disposed between the guiding rods and the inner sidewalls defined around the guiding grooves, the inner sidewalls defined around the guiding grooves rub the friction-proof sleeves during movement of the brake shoes. Thus, by mounting the friction-proof sleeves on the guiding rods, the guiding rods do not wear, such that the magnetically-controlled damping device can provide a relatively stable damping value. In addition, when the friction-proof sleeves need to be replaced, the friction-proof sleeves can be taken out from the guiding rods and replaced with new ones, which is easy and convenient. Accordingly, the guiding rods can have a longer service life.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
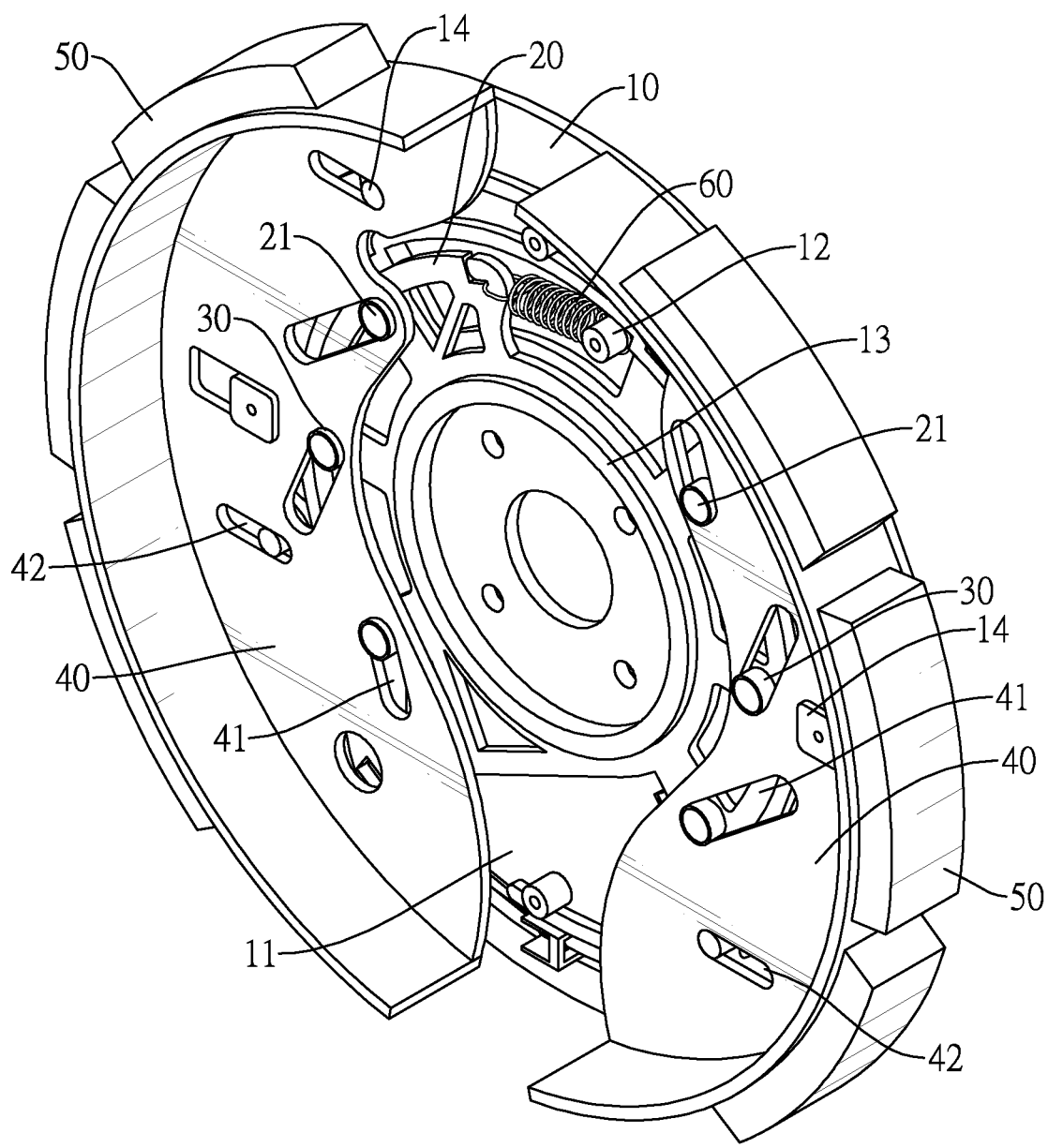
FIG. 1 is a perspective view of a magnetically-controlled damping device in accordance with the present invention.
Figure 2:
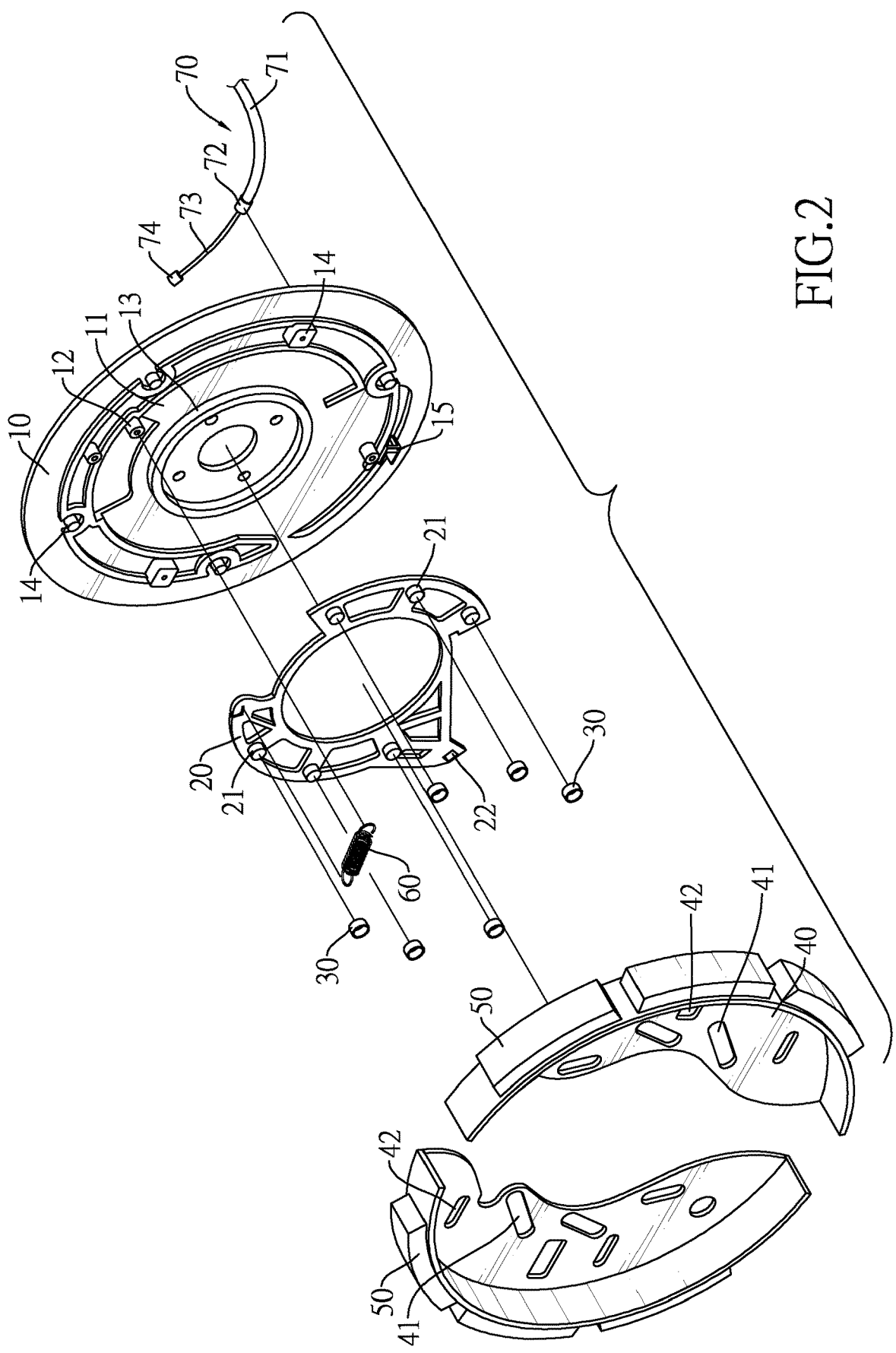
FIG. 2 is an exploded perspective view of the magnetically-controlled damping device in FIG. 1.

With reference to FIGS. 1 to 2, a magnetically-controlled damping device in accordance with the present invention comprises a fixing disk 10, a rotating disk 20, a plurality of friction-proof sleeves 30, a plurality of brake shoes 40, a plurality of magnets 50, an elastic element 60, and an operating element 70.

The fixing disk 10 comprises an assembling surface 11 and a fixing portion 12. The fixing portion 12 is disposed on the assembling surface 11 of the fixing disk 10. In other words, one of two side surfaces of the fixing disk 10 is the assembling surface 11.

In a preferred embodiment, the fixing disk 10 is circular, and an annular wall 13 is circular and coaxially protrudes from the assembling surface 11. However, shapes of the fixing disk 10 and the annular wall 13 are not limited to circles and may be other shapes.

In addition, the fixing portion 12 that is mounted on the assembling surface 11 is for connecting with the elastic element 60. In the preferred embodiment, the fixing portion 12 is a protrusion protruding from the assembling surface 11 of the fixing disk 10, and can be connected with the elastic element 60, but it is not limited thereto.

In addition, the fixing disk 10 further comprises a plurality of limiting rods 14. The limiting rods 14 are disposed on the assembling surface 11 and restrict the brake shoes 40 to move linearly only. In the preferred embodiment, the limiting rods 14 comprise, but are not limited to, square and circular rods that can limit moving directions of the brake shoes 40.

The rotating disk 20 is rotatably mounted on the assembling surface 11 of the fixing disk 10. The rotating disk 20 comprises a first side surface, a second side surface, and a plurality of guiding rods 21. The first side surface faces the fixing disk 10. The second side surface is opposite to the first side surface. The guiding rods 21 are mounted on the second side surface of the rotating disk 20. In the preferred embodiment, the rotating disk 20 is, but it is not limited thereto, hollow and is rotatably mounted around the annular wall 13 of the fixing disk 10, so as to allow the rotating disk 20 to rotate on the fixing disk 10. In addition, in the preferred embodiment, the guiding rods 21 include, but not limited to, six cylinders. The numbers, shapes, and arrangements of the guiding rods 21 are only for the purpose of guiding.

The friction-proof sleeves 30 are respectively mounted on the guiding rods 21. In the preferred embodiment, the friction-proof sleeves 30 are hollow tubes and are made of metal. An inner diameter of each friction-proof sleeve 30 is equal to an outer diameter of a corresponding one of the guiding rods 21. Therefore, the friction-proof sleeves 30 can be fitted on the guiding rods 21. However, the friction-proof sleeves 30 are only used for the purpose of anti-abrasion and are not limited to the above-mentioned material and size.

Figure 3:
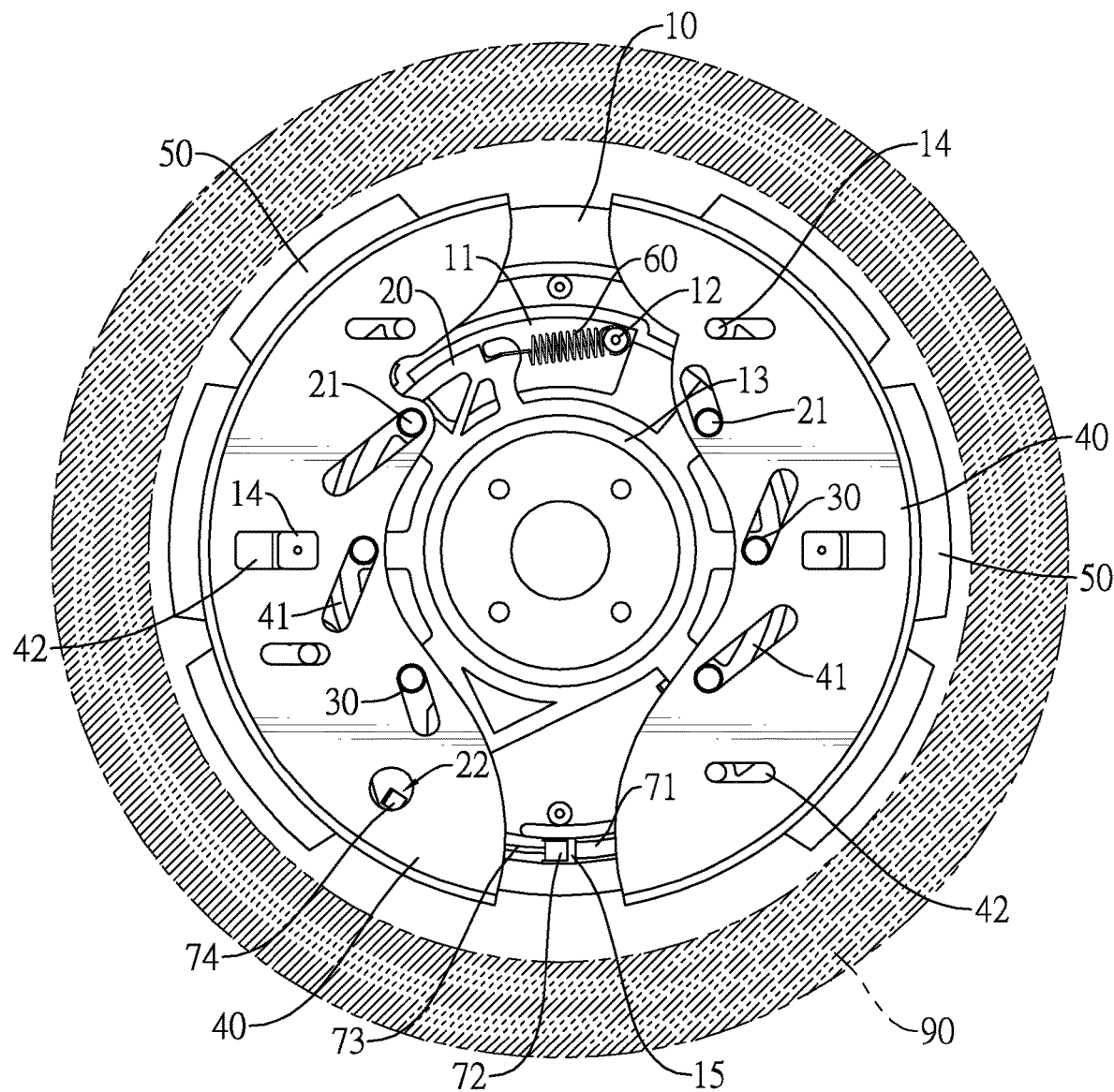
FIG. 3 is a front view of the magnetically-controlled damping device in FIG. 1, showing the device coaxially mounted in a rotating wheel.

With reference to FIGS. 1 to 3, the brake shoes 40 are movable relative to the rotating disk 20 and the fixing disk 10. The rotating disk 20 is located between the fixing disk 10 and the brake shoes 40. Each of the brake shoes 40 has a plurality of guiding grooves 41 and a plurality of limiting grooves 42. The guiding grooves 41 are respectively located around the friction-proof sleeves 30. Each guiding groove 41 has a respective inner sidewall defined around the guiding groove 41 and abutting against an outer sidewall of a corresponding one of the friction-proof sleeves 30. The limiting grooves 42 are respectively located around the limiting rods 14. Each limiting groove 42 has a respective inner sidewall defined around the limiting groove 42 and abutting against an outer sidewall of a corresponding one of the limiting rods 14.

In the preferred embodiment, the plurality of brake shoes 40 include two brake shoes 40 and each of the brake shoes 40 is semi-circular. The two brake shoes 40 are oppositely disposed on the second side surface of the rotating disk 20 with the guiding grooves 41 of the brake shoes 40 located around the friction-proof sleeves 30 on the guiding rods 21 respectively. Specifically, each of the two brake shoes 40 has, but not limited to, three guiding grooves 41 and three limiting grooves 42. The numbers, shapes and arrangements of the guiding grooves 41 and the limiting grooves 42 are only for the purpose of guiding and limiting.

Figure 6:
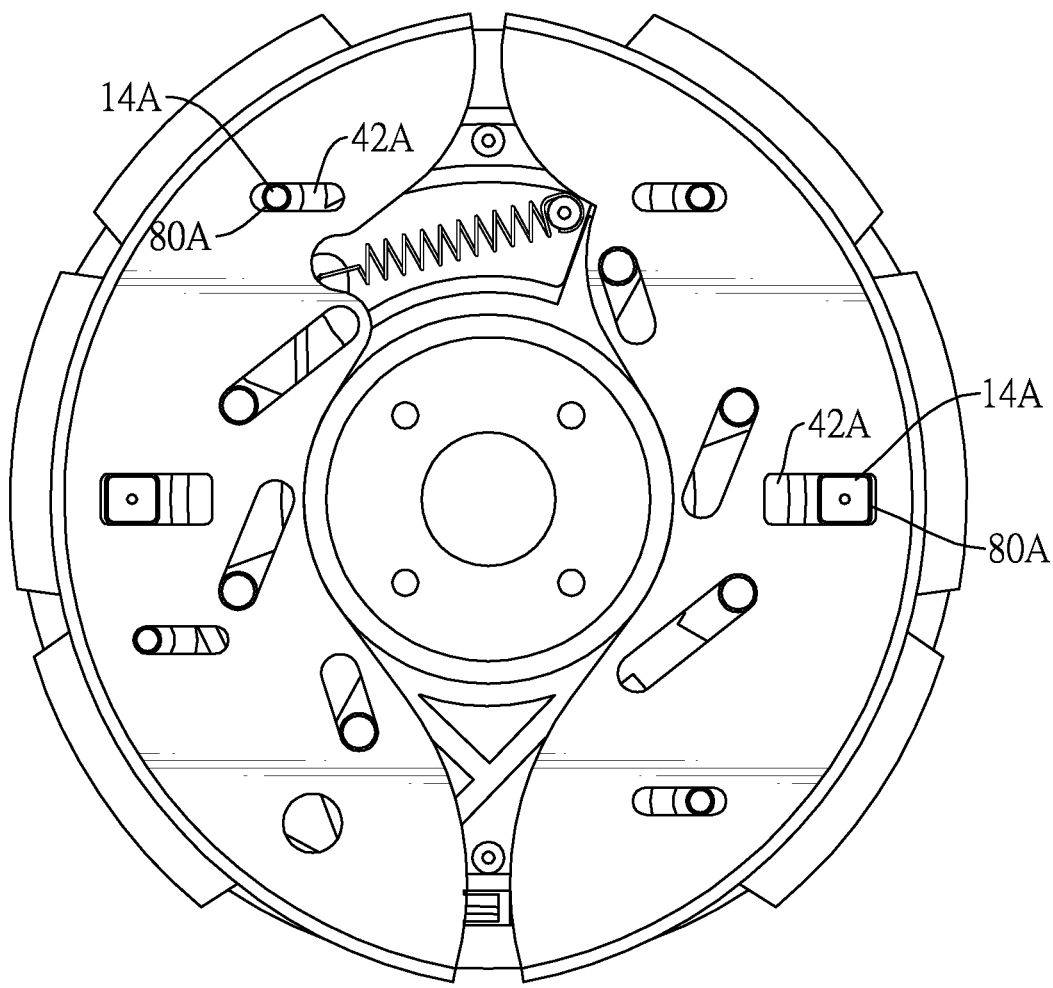
FIG. 6 is a front view of another embodiment of a magnetically-controlled damping device in accordance with the present invention.

With reference to FIG. 6, in another preferred embodiment, each of the limiting rods 14A is sleeved by a rod sleeve 80A. Each limiting groove 42A has a respective inner sidewall defined around the limiting groove 42A and abutting against a corresponding one of the rod sleeves 80A. Specifically, each rod sleeves 80A is a hollow tube and matches in shape with a corresponding one of the limiting rods 14A and may be made of, but not limited to, metal.

With reference to FIGS. 1 to 3, the magnets 50 are mounted on outer side surfaces of the brake shoes 40. In the preferred embodiment, each of the brake shoes 40 is mounted with three magnets 50. The magnets 50 are arranged along the outer side surfaces of the brake shoe 40. Alternatively, the magnets 50 may be mounted on a side surface of each brake shoe 40 and disposed adjacent to the outer side surface of the brake shoe 40. The number of the magnets 50 may also be changed according to requirements.

The elastic element 60 is mounted between and is connected to the fixing portion 12 and the rotating disk 20, and allows the rotating disk 20 to rotate relative to the fixing disk 10. In the preferred embodiment, the elastic element 60 is, but not limited to, a tension spring, a compression spring, or other elastic elements.

With reference to FIGS. 2 to 3, the operating element 70 is able to drive the rotating disk 20 to rotate relative to the fixing disk 10 against an elastic force of the elastic element 60. In the preferred embodiment, the operating element 70 is a connecting wire with an end connected to the rotating disk 20. Specifically, the operating element 70 includes a wire sleeve 71, a connecting base 72, a wire 73 and a connector 74. The connecting base 72 is mounted on an end of the wire sleeve 71 and is fixed to the fixing disk 10. The wire 73 is movably mounted through the wire sleeve 71 and the connecting base 72 and has an outer end protruding out of the wire sleeve 71. The connector 74 is mounted on the outer end of the wire 73 and is fixed to the rotating disk 20.

Specifically, the rotating disk 20 is provided with an engaging slot 22, and the connector 74 is mounted in the engaging slot 22. The fixing disk 10 is provided with a stopping portion 15, and the connecting base 72 is mounted in the stopping portion 15.

When the wire 73 moves into the wire sleeve 71, the rotating disk 20 is rotated to drive the brake shoes 40 to move. In other words, when the operating element 70 drives the rotating disk 20 to rotate, the rotating disk 20 drives the brake shoes 40 to move through the guiding rods 21, the friction-proof sleeves 30 and the guiding grooves 41. However, the operating element 70 is not limited to the above-mentioned configuration, and can be of any other forms of control element.

With reference to FIG. 3, the magnetically-controlled damping device can be mounted coaxially in a space enclosed by an inner surface of a rotating wheel 90. Thus, the magnets 50 on the outer side surfaces of the brake shoes 40 of the magnetically-controlled damping device are disposed apart from the inner surface of the rotating wheel 90.

Figure 5:
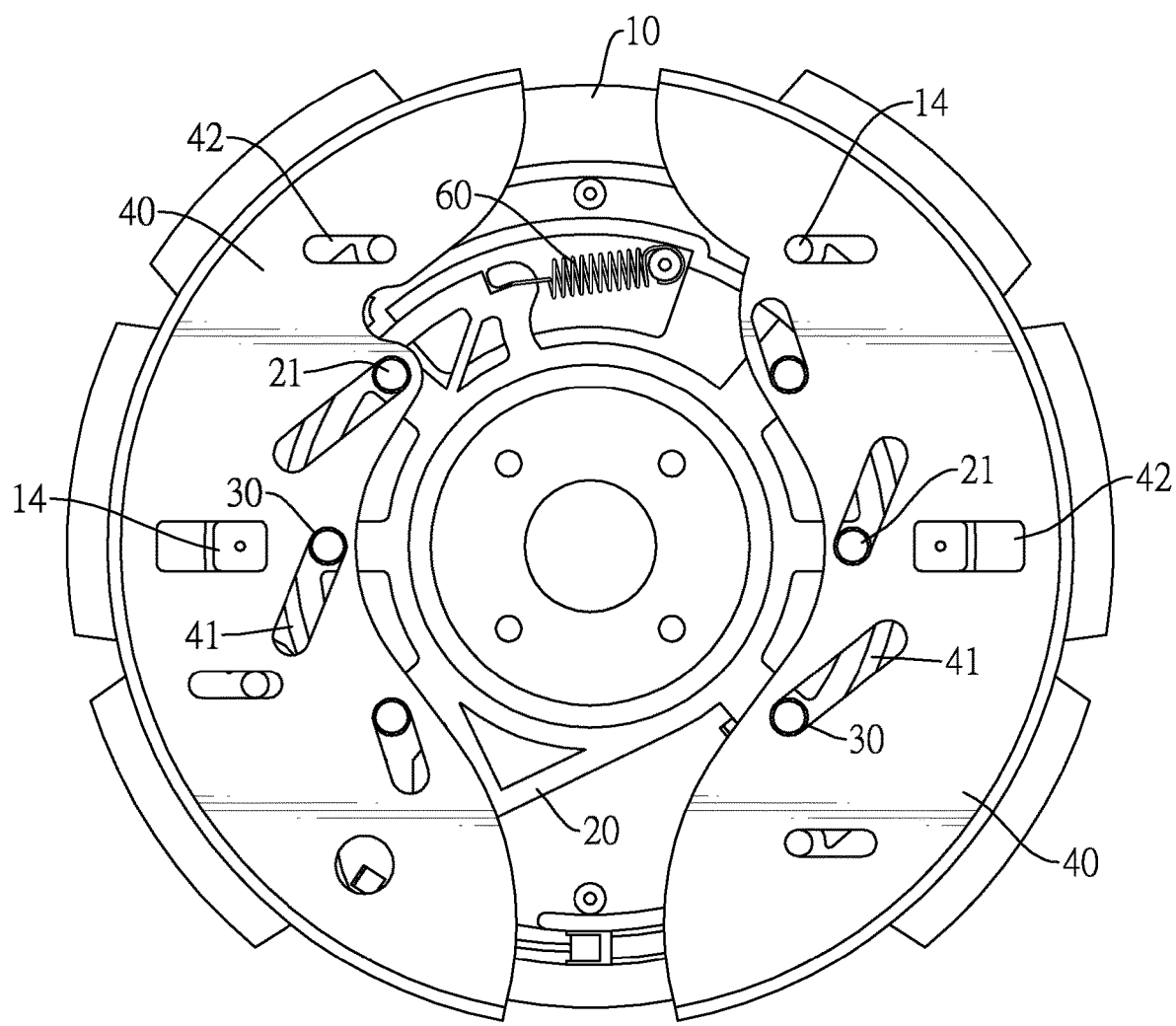

As shown in FIG. 5, before the magnetically-controlled damping device is operated, the rotating disk 20 is disposed at a specific position by a tensile force of the elastic element 60. Since the brake shoes 40 are disposed at a farthest position from a center of the fixing disk 10, each magnet 50 and the rotating wheel 90 are disposed closest to each other. Since a distance between each magnet 50 and the rotating wheel 90 is the shortest, the rotating wheel 90 is subjected to a greatest magnetic resistance.

Figure 4:
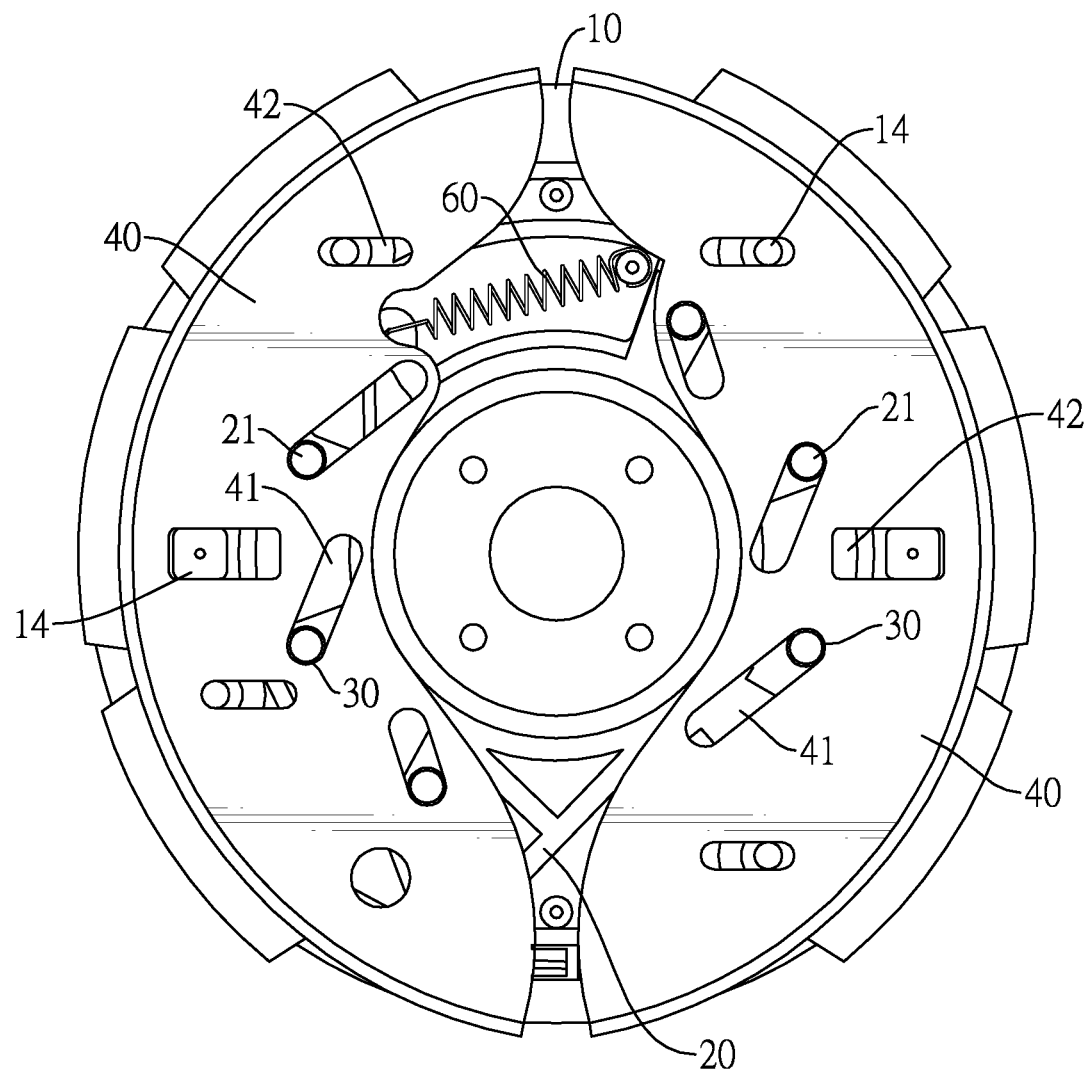
FIG. 4-5 are operational front views of the magnetically-controlled damping device in FIG. 1.

With further reference to FIG. 4, when a user intends to reduce the magnetic resistance applied on the rotating wheel 90, the rotating disk 20 is rotated by pulling the operating element 70 against the elastic force of the elastic element 60. When the rotating disk 20 rotates, the guiding rods 21 are also rotated, and the friction-proof sleeves 30 on the guiding rods 21 and in the guiding grooves 41 urge the brake shoes 40 to move away from the rotating wheel 90. As the distance between each magnet 50 and the rotating wheel 90 is getting farther and farther, the magnetic resistance applied on the rotating wheel 90 is gradually reduced until an end of each limiting groove 42 of each brake shoe 40 abuts against the corresponding limiting rod 14 and the brake shoes 40 stop moving.

In the preferred embodiment, the friction-proof sleeves 30 are sleeved on the guiding rods 21, and the friction-proof sleeves 30 are disposed between the guiding rods 21 and the inner sidewalls defined around the guiding grooves 41. Thereby, the guiding rods 21 do not wear and can provide a stable damping value when the brake shoes 40 are moved. In addition, when the friction-proof sleeves 30 need to be replaced, the friction-proof sleeves 30 can be taken out from the guiding rods 21 and replaced with new ones, which is easy and convenient. Accordingly, the guiding rods 21 can have a long service life.

In the preferred embodiment, since the brake shoes 40 comprise the limiting grooves 42 and are mounted on the limiting rods 14 of the fixing disk 10, the limiting rods 14 can limit the moving directions of the brake shoes 40 when being moved. Thus, the brake shoes 40 do not arbitrarily offset. Moreover, with the rod sleeves 40 on the limiting rods 14, the limiting rods 14 can also have increased service life.

In the preferred embodiment, since the connecting wire is used as the operating element 70, the movement of the brake shoes 40 can be adjusted in a relatively linear manner, so that the user can easily adjust the magnetically-controlled damping device to form a desired damping value.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A magnetically-controlled damping device comprising:
    a fixing disk comprising
        an assembling surface; and
        a fixing portion disposed on the assembling surface of the fixing disk;
    a rotating disk rotatably mounted on the assembling surface of the fixing disk, and including
        a first side surface facing the fixing disk;
        a second side surface being opposite to the first side surface; and
        a plurality of guiding rods protruding from the second side surface of the rotating disk;
    a plurality of friction-proof sleeves mounted on the guiding rods respectively; and
    a plurality of brake shoes, the rotating disk located between the fixing disk and the brake shoes, the brake shoes being movable relative to the rotating disk and the fixing disk, each of the brake shoes including a plurality of guiding grooves, the guiding grooves located around the friction-proof sleeves respectively, and each guiding groove having an inner sidewall defined around the guiding groove abutting against an outer sidewall of a corresponding one of the friction-proof sleeves;
    a plurality of magnets located on outer side surfaces of the brake shoes;
    an elastic element mounted between and connected to the fixing portion and the rotating disk, and allowing the rotating disk to rotate relative to the fixing disk;
    an operating element being able to drive the rotating disk to rotate relative to the fixing disk against an elastic force of the elastic element;
    wherein, when the operating element drives the rotating disk to rotate, the rotating disk moves the brake shoes through the guiding rods, the friction-proof sleeves, and the guiding grooves.

2. The magnetically-controlled damping device as claimed in claim 1, wherein
    the fixing disk comprises a plurality of limiting rods disposed on the assembling surface of the fixing disk; and
    the brake shoes comprise a plurality of limiting grooves located around the limiting rods respectively.

3. The magnetically-controlled damping device as claimed in claim 2, wherein
    each of the limiting rods is sleeved by a rod sleeve; and
    each limiting groove has a respective inner sidewall defined around the limiting groove and abutting against a corresponding one of the rod sleeves.

4. The magnetically-controlled damping device as claimed in claim 3, wherein the rod sleeves are made of metal.

5. The magnetically-controlled damping device as claimed in claim 1, wherein the fixing disk further comprises an annular wall coaxially protruding from the assembling surface.

6. The magnetically-controlled damping device as claimed in claim 1, wherein the friction-proof sleeves are made of metal.

7. The magnetically-controlled damping device as claimed in claim 1, wherein the operating element is a connecting wire, and an end of the connecting wire is connected to the rotating disk.

8. The magnetically-controlled damping device as claimed in claim 7, wherein the connecting wire comprises
    a wire sleeve;
    a connecting base mounted on an end of the wire sleeve, and fixed to the fixing disk;
    a wire movably mounted through the wire sleeve and the connecting base and having an outer end, and the outer end of the wire protruding out of the wire sleeve; and
    a connector mounted on the outer end of the wire and fixed to the rotating disk.

* * * * *